United States Patent
Satoh et al.

(10) Patent No.: US 8,212,736 B2
(45) Date of Patent: Jul. 3, 2012

(54) ANTENNA DEVICE AND COMMUNICATION DEVICE

(75) Inventors: Hiroshi Satoh, Ishikawa (JP); Yoshio Koyanagi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 246 days.

(21) Appl. No.: 12/746,491

(22) PCT Filed: Dec. 4, 2007

(86) PCT No.: PCT/JP2007/073417
§ 371 (c)(1),
(2), (4) Date: Jun. 4, 2010

(87) PCT Pub. No.: WO2009/072189
PCT Pub. Date: Jun. 11, 2009

(65) Prior Publication Data
US 2010/0277395 A1    Nov. 4, 2010

(51) Int. Cl.
*H01Q 3/24* (2006.01)
(52) U.S. Cl. ........................................ 343/876
(58) Field of Classification Search .................. 343/876, 343/702, 700 MS
See application file for complete search history.

(56) References Cited

U.S. PATENT DOCUMENTS

| | | | | |
|---|---|---|---|---|
| 5,532,708 A | * | 7/1996 | Krenz et al. | 343/795 |
| 5,550,554 A | * | 8/1996 | Erkocevic | 343/828 |
| 6,107,972 A | * | 8/2000 | Seward et al. | 343/722 |
| 6,870,515 B2 | | 3/2005 | Kitchener | |
| 8,085,208 B2 | * | 12/2011 | Wallace | 343/749 |
| 2009/0127641 A1 | * | 5/2009 | Koyama | 257/428 |
| 2010/0033397 A1 | * | 2/2010 | Narasimhan et al. | 343/860 |

FOREIGN PATENT DOCUMENTS

| | | |
|---|---|---|
| JP | 2001-203672 A | 7/2001 |
| JP | 2004-080353 A | 3/2004 |
| JP | 2004-517549 A | 6/2004 |
| JP | 2004-312381 A | 11/2004 |
| JP | 2005-045346 A | 2/2005 |
| JP | 2005-086518 A | 3/2005 |
| JP | 2005-340910 A | 12/2005 |

OTHER PUBLICATIONS

International Search Report, mailed Mar. 4, 2008, issued in corresponding International Patent Application No. PCT/JP2007/073417, filed Dec. 4, 2007.

* cited by examiner

*Primary Examiner* — Huedung Mancuso
(74) *Attorney, Agent, or Firm* — Seed IP Law Group PLLC

(57) ABSTRACT

An antenna device and a communication device capable of changing over polarization characteristics of an antenna to improve transmission capacity in various kinds of polarization environments and used configuration by preventing reduction of the communication capacity for a reception signal degrading or varying depending on momentarily changing polarization conditions between a base station and a terminal. The antenna device (110) includes a plurality of first antenna elements (111,112) for a first polarizing direction, a second antenna element (121) provided in the direction orthogonal to the first polarizing direction, a plurality of switches (131,132) for switching connection between the plurality of first antenna elements (111,112) and the second antenna element (121), and power supply parts (141,142) respectively provided on the plurality of first antenna elements (111,112).

4 Claims, 15 Drawing Sheets

|  | MODE1 | MODE2 | MODE3 |
|---|---|---|---|
| SW1 | OFF | ON | OFF |
| SW2 | OFF | OFF | ON |
| Rx1 | V | +45° | V |
| Rx2 | V | V | −45° |

|     | MODE4 | MODE5 | MODE6 |
|-----|-------|-------|-------|
| SW1 | OFF   | ON    | OFF   |
| SW2 | OFF   | OFF   | ON    |
| Rx1 | V     | −45°  | V     |
| Rx2 | V     | V     | +45°  |

FIG.7

|     | MODE1 | MODE2 | MODE3 |
| --- | --- | --- | --- |
| SW1 | OFF | OFF | ON |
| SW2 | OFF | ON | OFF |
| SW3 | OFF | ON | OFF |
| SW4 | OFF | OFF | ON |
| Rx1 | V | V | +45° |
| Rx2 | V | V | V |
| Rx3 | V | V | −45° |

FIG.11

|     | MODE4 | MODE5 | MODE6 |
| --- | --- | --- | --- |
| SW1 | OFF | OFF | OFF |
| SW2 | OFF | OFF | ON |
| SW3 | ON | OFF | OFF |
| SW4 | OFF | ON | ON |
| Rx1 | V | V | V |
| Rx2 | +45° | V | −45° |
| Rx3 | V | −45° | −45° |

FIG.12

|     | MODE7 | MODE8 | MODE9 |
| --- | --- | --- | --- |
| SW1 | OFF | ON | ON |
| SW2 | ON | OFF | OFF |
| SW3 | OFF | OFF | ON |
| SW4 | OFF | OFF | OFF |
| Rx1 | V | +45° | +45° |
| Rx2 | −45° | V | +45° |
| Rx3 | V | V | V |

ANTENNA DEVICE AND COMMUNICATION DEVICE

TECHNICAL FIELD

The present invention relates to an antenna apparatus and communication apparatus such as a mobile telephone device. In particular, the present invention relates to an antenna apparatus and communication apparatus using a plurality of antenna elements for performing diversity operations, MIMO (Multiple-Input Multiple-Output) communication or adaptive array antenna operations.

BACKGROUND ART

An antenna apparatus is provided in various communication devices to transmit and receive radio waves of a predetermined frequency band. The popularity and the range of application of portable radio devices represented by mobile telephones have grown, and therefore there is a growing demand for wideband capability of portable radio device antennas. Also, with the rapid spread of portable radio devices, the number of channels in one wireless communication system is likely to be insufficient. Consequently, studies are underway to use one system together with other wireless communication systems using different frequency bands to secure a necessary number of channels. With significant advances in techniques for reducing size and weight, as a terminal, a single portable radio device that can use two kinds of wireless communication systems have been developed. Moreover, a bandwidth of several hundreds MHz is considered to be necessary in the UHF band for, for example, reception of terrestrial digital broadcast. Furthermore, to reduce the size of a radio apparatus by supporting a plurality of WLAN (Wireless Local Area Network) standards using different frequency bands by means of a single antenna, for example, an antenna covering the 2.4 GHz and 5.2 GHz bands is required.

In communication between a mobile station and base station in a mobile communication system, fading often occurs in which the received signal level fluctuates depending on various radio wave propagation environments. Effective measures to take against fading include providing antenna selective diversity and combined diversity. With antenna selective diversity, a plurality of antennas are generally installed, and communication is performed by selecting an antenna with good conditions when the receiving state degrades due to fading. For example, there are antenna selective diversity apparatuses with a TDMA (Time Division Multiple Access) communication scheme in which the same frequency is shared by a plurality of users by means of time division.

Also, in recent wireless communication systems, MIMO communication has attracted attention as a technique to improve the efficiency of transmission. In MIMO communication, a transmitting apparatus having a plurality of transmitting antennas simultaneously transmit streams comprised of a plurality of bits from these transmitting antennas, and a receiving apparatus having a plurality of receiving antennas demultiplex and demodulate those streams from the transmitting apparatus. Therefore, when mutually different streams are simultaneously transmitted from all of the transmitting antennas of the transmitting apparatus, compared to the case of one transmitting antenna, theoretically, it is possible to increase the efficiency of transmission to the multiples of the number of transmitting antennas.

In communication providing a plurality of antenna elements and adopting diversity operations, MIMO communication or adaptive array antenna operations, the directivity of a single antenna alone is not sufficient to cope with the fluctuation of polarization conditions which change every minute between a base station and a terminal. In particular, the directivity of a single antenna alone is not sufficient to cope with the fluctuation of polarization characteristics of received signals. To secure the communication capacity, an antenna system is necessary which flexibly responds to the fluctuation of polarization characteristics.

As measures to take against the above, Patent Documents 1 to 4 disclose techniques to improve communication capacity utilizing polarization.

Patent Document 1 discloses a communication apparatus and method using adaptive array antennas by which a base station switches polarization characteristics and in which the terminal side performs reception with a polarization matching a polarization characteristic from the base station. With the apparatus disclosed in Patent Document 1, if the base station outputs a vertically polarized wave, the terminal receives this with vertical polarization. By this means, antenna polarization matches between the terminal and the base station, so that it is possible to improve communication capacity. Further, by performing communication using polarizations which change between terminals, it is possible to suppress the interference for communication paths between the terminals and the base station.

Patent Document 2 discloses a radio wave transmitting and receiving apparatus for improving communication capacity by providing a plurality of antenna elements of different polarizations in a base station, implementing selective diversity and performing MIMO operations using this antenna group.

Patent Document 3 discloses an antenna apparatus that performs directivity synthesis using a plurality of antenna elements from a large number of antenna elements and then performs MIMO communication.

Patent Document 4 discloses a MIMO wireless communication system for providing a plurality of antenna elements of different polarizations both in a base station and in a terminal, and performing MIMO. By this means, the directivity and polarization change between antenna elements for transmission and reception in MIMO propagation paths, and the separation level between propagation paths improves, so that it is possible to improve communication capacity.

Patent Document 1: Japanese Patent Application Laid-Open Number 2004-80353
Patent Document 2: Japanese Patent Application Laid-Open Number 2004-312381
Patent Document 3: Japanese Patent Application Laid-Open Number 2005-86518
Patent Document 4: Japanese Patent Application Laid-Open Number 2004-517549

DISCLOSURE OF INVENTION

Problems to be Solved by the Invention

However, such a conventional portable radio device having a plurality of antenna elements has the following problems.

(1) In the apparatus disclosed in Patent Document 1, a base station communicates with terminals by switching polarization characteristics per antenna and the apparatus switches polarization from the base station per terminal, thereby improving separation between communication paths. However, with this technique, polarization from a base station changes depending on the propagation environment, and, consequently, it is difficult to secure the separation level between paths in terminals. Also, polarization of terminals is not fixed in mobile telephones, and therefore it is difficult to separate paths.

(2) The apparatus disclosed in Patent Document 2 selects the best antenna element from an antenna group having a plurality of antenna elements of different polarizations and implement diversity or perform MIMO using that antenna element. However, with this technique, although the transmission capacity in MIMO is increased by switching polarization per antenna, the gradient of terminals is not taken into account, and therefore the transmission capacity may be degraded depending on the condition of gradient.

(3) The apparatus disclosed in Patent Document 3 performs directivity synthesis using a plurality of antenna elements from a large number of antenna elements and then performs MIMO communication. That is, by performing directivity synthesis after adjusting the amplitude and phase using a plurality of antenna elements, it is possible to provide directivity suitable to various propagation characteristics and polarization characteristics. However, this technique does not disclose that the terminal side acquires an antenna of an optimal polarization characteristic not depending on the operating states of a base station, propagation environment and terminal. Further, this technique does not disclose an antenna apparatus that provides various polarization patterns in accordance with polarization characteristics, where these polarization characteristics provide extremely low power loss and change depending on place and time.

(4) The apparatus disclosed in Patent Document 4 provides a plurality of antenna elements of different polarizations both in a base station and in a terminal, and performs MIMO. The polarizations of antennas are not switched depending on changes in the propagation environment, and the same directivities and polarization characteristics are always used. Similar to the apparatus disclosed in Patent Document 3, this technique does not disclose that the terminal side acquires an antenna of an optimal polarization characteristic not depending on the operating states of a base station, propagation environment and terminal. Further, this technique does not disclose an antenna apparatus that provides various polarization patterns in accordance with polarization characteristics, where these polarization characteristics provide extremely low power loss and change depending on place and time Therefore, with an antenna apparatus and communication apparatus using a plurality of conventional antenna elements, when a base station and terminal perform communication, it is necessary to provide a larger communication capacity more reliably by responding to changes in polarization by antennas. Here, changes in polarization occur depending on: polarizations of base station antennas; changes in polarization characteristics due to radio propagation characteristics between the base station and the terminal; the method of using the terminal by the user; and various conditions such as the gradient of the terminal.

In view of the above, it is an object of the present invention to provide an antenna apparatus and communication apparatus that can switch antenna polarization characteristics, prevent the decrease in communication capacity for received signals that attenuate or fluctuate depending on the conditions of polarization that changes every minute between a base station and a terminal.

Means for Solving the Problem

The antenna apparatus of the present invention employs a configuration having: at least two first antenna elements for a first polarization direction; a second antenna element that is set in a direction orthogonal to the first polarization direction; a switch that switches connections between the first antenna elements and the second antenna element; and a feeding section that is set in each of the first antenna elements.

The communication apparatus of the present invention employs a configuration having the above antenna apparatus used for MIMO (Multiple Input Multiple Output) or diversity.

Advantageous Effect Of The Invention

According to the present invention, by switching the antenna polarization characteristics, it is possible to provide optimal antenna performance for received signals that attenuate or fluctuate depending on the conditions of polarization that changes every minute between a base station and a terminal. Further, it is equally possible to provide an advantage of preventing the decrease in communication capacity in communication using a plurality of antenna elements for performing diversity operations, MIMO communication or adaptive array antenna operations. By this means, for example, it is possible to flexibly cope with changes in polarization that occur depending on: polarization characteristics of base station antennas; radio propagation characteristics between the base station and a terminal; the method of using the terminal by the user; and various conditions such as the gradient of the terminal. Therefore, it is possible to provide the best signal level, prevent the decrease in communication capacity and improve transmission capacity in various polarization environments and usage types.

BRIEF DESCRIPTION OF DRAWINGS

FIG. 7 shows a table illustrating switching of polarization characteristics in FIGS. 6A to 6C;

FIG. 11 shows a table illustrating switching of polarization characteristics in FIGS. 10A to 10C;

FIG. 12 shows a table illustrating switching of polarization characteristics in FIGS. 10D to 10F;

BEST MODE FOR CARRYING OUT THE INVENTION

Embodiments of the present invention will be explained below in detail with reference to the accompanying drawings.

(Embodiment 1)

Figure 1:
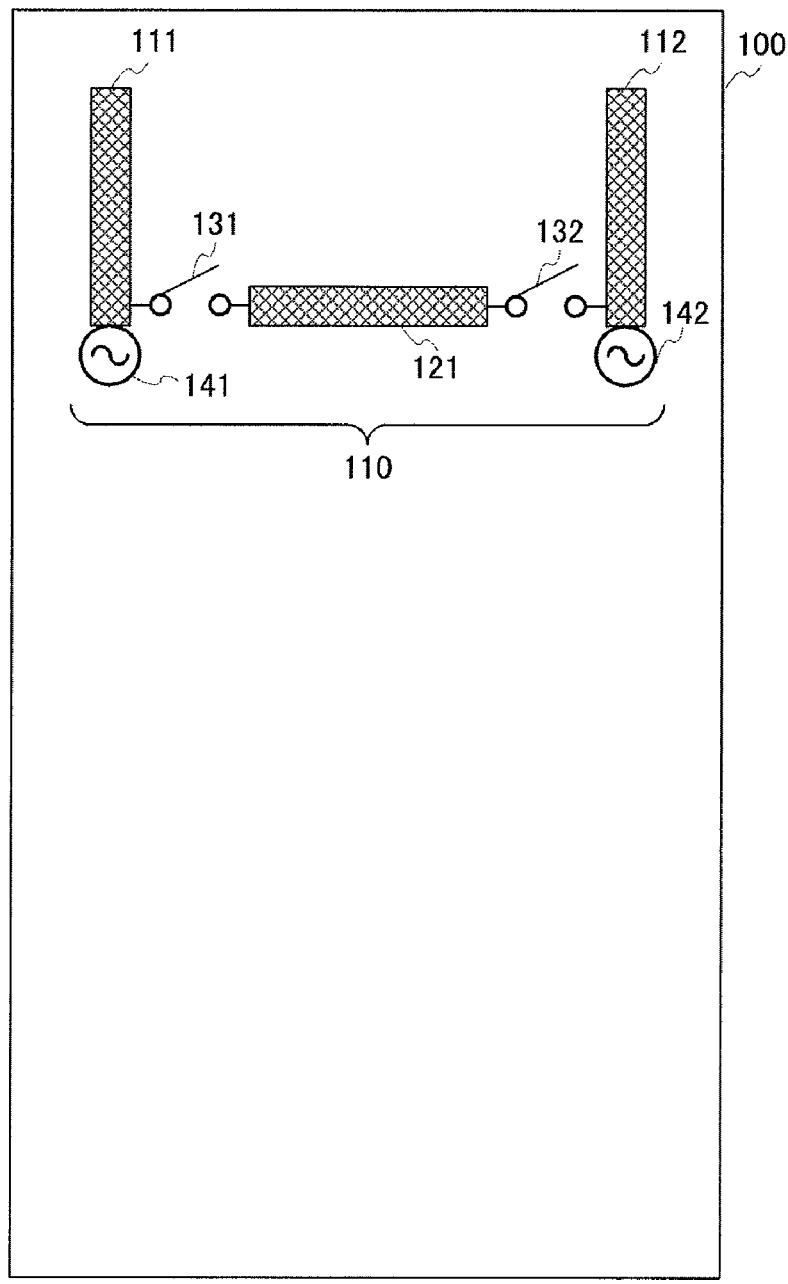
FIG. 1 shows an outline configuration of a portable radio device mounting an antenna apparatus according to Embodiment 1 of the present invention.

FIG. 1 shows an outline configuration of a portable radio device mounting an antenna apparatus using a plurality of antenna elements according to Embodiment 1 of the present invention. An example case will be described where the present embodiment is applied to a portable radio device mounting a terminal antenna apparatus used in MIMO communication or diversity communication.

In FIG. 1, portable radio device 100 has, inside the housing, antenna apparatus 110 using a plurality of antenna elements used in MIMO communication or diversity communication.

Portable radio device 100 only needs to represent a portable radio device mounting antenna apparatus 110 using a plurality of antenna elements used in MIMO communication or diversity communication, such as a mobile telephone device and PHS (Personal Handy-phone System). Also, portable information terminals such as PDA's (Personal Digital Assistants) and information processing apparatuses such as a laptop computer are applicable.

The housing of portable radio device 100 is formed with a molded insulating resin such as a non-conductive ABS resin. Also, as measures to take against degradation in antenna efficiency upon close antenna elements, for example, the housing uses metamaterials to prevent degradation in antenna efficiency. Also, as is not shown in the figure, portable radio device 100 is provided with an LCD display section, a sub-screen display section, a speaker that outputs, for example, a ringtone, a camera section that photographs an image, a connector that connects with external devices, and so on.

Antenna apparatus 110 is provided with first antenna elements 111 and 112 for the first polarization direction, second antenna element 121 that is set in the direction orthogonal to the first polarization direction, switches 131 and 132 that switch connection between first antenna elements 111 and 112 and second antenna element 121, and feeding sections 141 and 142 that are provided in first antenna elements 111 and 112, respectively.

As shown in FIG. 1, antenna apparatus 110 employs a configuration in which three antenna elements (i.e. first antenna elements 111 and 112 and second antenna element 121) are arranged in the shape of the letter "U," two switches (i.e. switches 131 and 132) are arranged between these antenna elements, and two feeding sections (i.e. feeding sections 141 and 142) are arranged in one end of first antenna elements 111 and 112.

Assume that first antenna elements 111 and 112 and second antenna element 121 are formed with metal frames and have a length of approximately $\lambda/4$ (where $\lambda$ is the wavelength) in the longitudinal direction. Regarding the antenna element parallel to the housing, when this antenna element is set as far as possible from this housing, the antenna efficiency improves and is therefore advantageous. The materials naturally carries radio waves, and examples include copper, iron and magnesium alloy providing a high conduction level with low loss at used frequencies and having high hardness with lightweight.

Switches 131 and 132 switch the connections between second antenna element 121 and first antenna element 111 and/or first antenna element 112, according to a control signal from a control section (not shown). Also, the control section (not shown) outputs a control signal to switches 131 and 132 for switching the connections according to the polarization direction.

Switches 131 and 132 use switches providing minimum loss at used frequencies in the case where switches 131 and 132 are turned on, and use switches providing as much isolation as possible in the case where switches 131 and 132 are turned off. Further, switches 131 and 132 need to withstand the large power of transmission waves upon transmission. For example, it is preferable to use MEMS (Micro-Electro-Mechanical System) switches with low loss. Also, specific examples of combinations of switching in switches 131 and 132 will be described later.

Feeding sections 141 and 142 are formed with conductive metals and connected with first antenna elements 111 and 112 for feeding these antenna elements.

If switch 131 is turned off and first antenna element 111 and second antenna element 121 are separated from each other, first antenna element 111 and feeding section 141 operate as a monopole antenna. Similarly, if switch 132 is turned off and first antenna element 112 and second antenna element 121 are separated from each other, first antenna element 112 and feeding section 142 operate as an monopole antenna. Also, second antenna element 121 is arranged orthogonal to first antenna elements 111 and 112 such that second antenna element 121 links these two monopole feeding sections.

Here, antenna apparatus 110 incorporated in portable radio device 100 may be mounted transversely to the housing of portable radio device 100.

Figure 2:
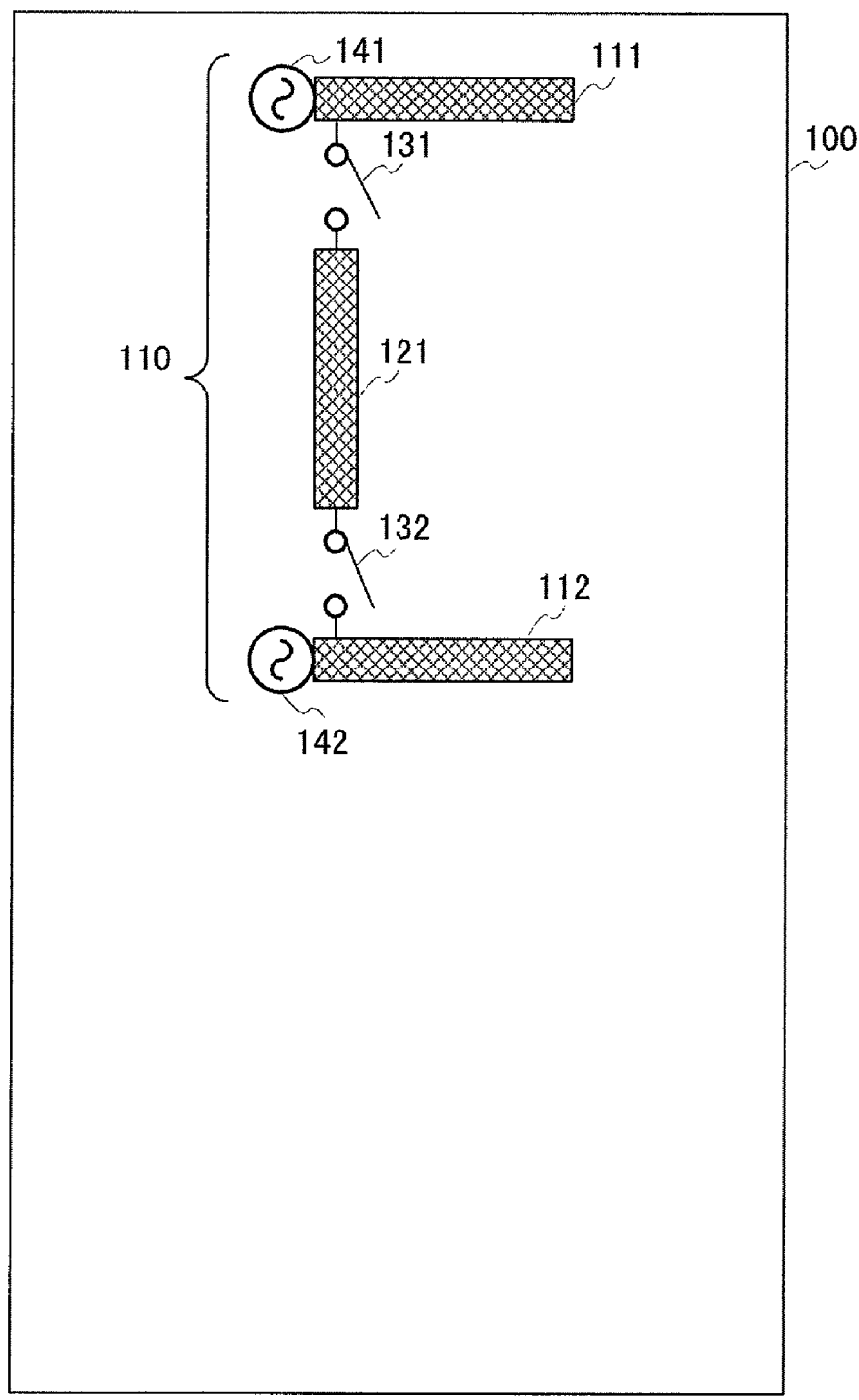
FIG. 2 shows an outline configuration of a portable radio device mounting the above antenna apparatus according to Embodiment 1.

FIG. 2 shows an outline configuration of portable radio device 100 having above antenna apparatus 110. The same components as in FIG. 1 will be assigned the same reference numerals.

As shown in FIG. 2, three antenna elements are arranged in the shape of the letter "U" such that antenna apparatus 110 is transversely arranged to the housing of portable radio device 100. If antenna apparatus 110 is transversely arranged, the performance is the same as in FIG. 1. By arranging antenna apparatus 110 transversely, it is possible to improve the degree of freedom of arrangement of parts in the housing.

The operations of antenna apparatus 110 configured as above will be explained.

An example case will be described where MIMO communication that switches polarization characteristics depending on the condition is performed to cope with various polarizations.

Figure 3A:
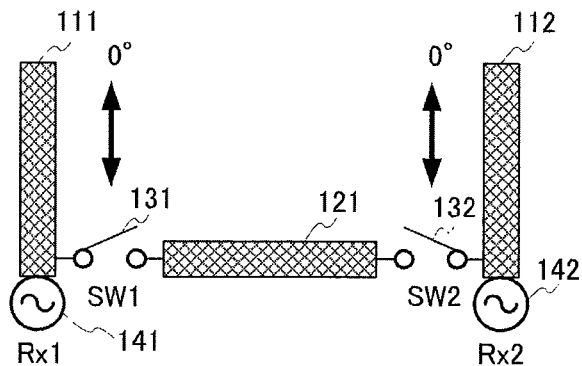
FIG. 3A illustrates switching of polarization characteristics of the above antenna apparatus according to Embodiment 1.
Figure 3B:
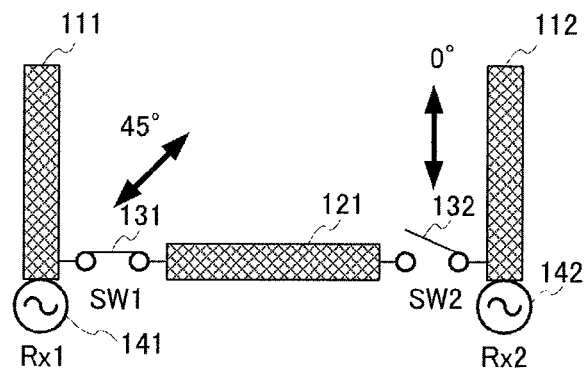
FIG. 3B illustrates switching polarization characteristics of the above antenna apparatus according to Embodiment 1.
Figure 3C:
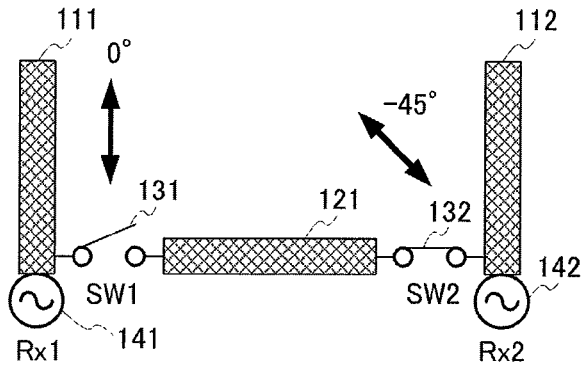
FIG. 3C illustrates switching of polarization characteristics of the above antenna apparatus according to Embodiment 1.
Figures 4, 5:
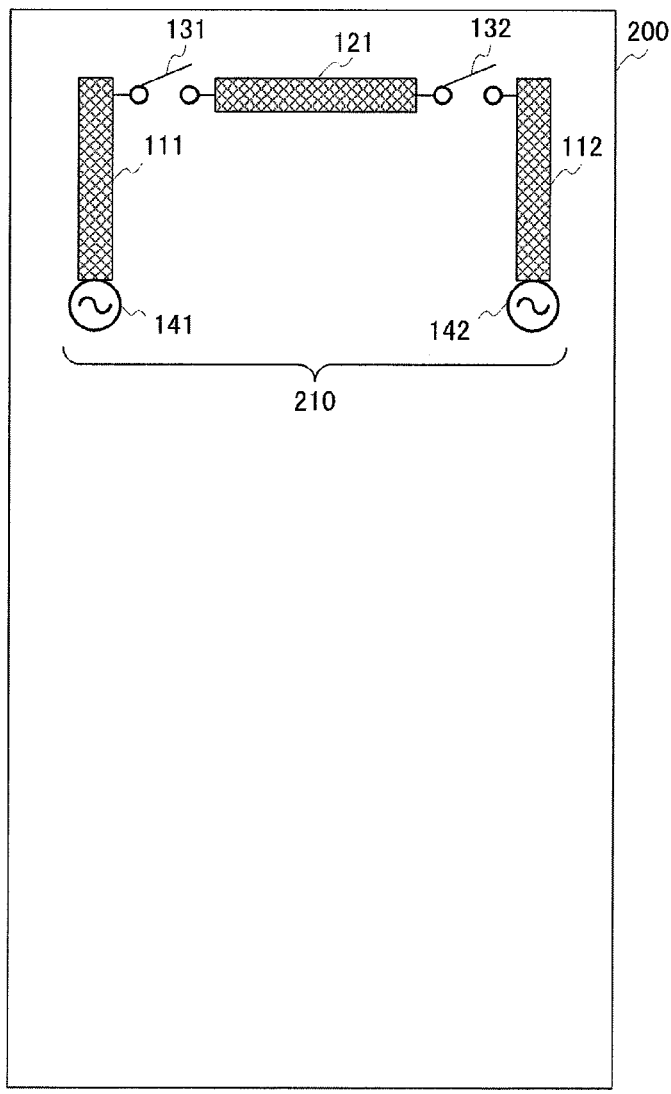
FIG. 4 shows a table illustrating switching of polarization characteristics in FIGS. 3A to 3C.
FIG. 5 shows an outline configuration of a portable radio device mounting an antenna apparatus according to Embodiment 2 of the present invention.

FIGS. 3A to 3C illustrate switching of polarization characteristics of antenna apparatus 110, where FIG. 3A shows vertical polarization in MIMO, FIG. 3B shows diagonal polarization (MIMO+) and FIG. 3C shows diagonal polarization (MIMO−). Also, FIG. 4 shows a table illustrating switching of polarization characteristics in FIGS. 3A to 3C. In FIGS. 3A to 3C and FIG. 4, diagonal polarization is inclined at +45 degrees or −45 degrees from vertical polarization. The direction of polarization is shown by the arrow points in the figure. SW 1 and SW 2 represent switches 131 and 132, and Rx 1 and Rx 2 represent the receiving ends of portable radio device 100 with which antenna apparatus 110 is connected. Also, V represents vertical polarization. Also, if this antenna apparatus 110 is applied to the base station side that performs MIMO communication, Rx 1 and Rx 2 need to be read as Tx 1 and Tx 2.

[First Scheme (Mode 1)]

As shown in FIG. 3A and FIG. 4, switch 131 (SW 1) and switch 132 (SW 2) are turned off. Then, second antenna element 121 is separated from first antenna elements 111 and 112, and only first antenna elements 111 and 112 in the first polarization direction perform monopole antenna operations. Therefore, antenna apparatus 110 has antenna characteristics of (90 degrees-90 degrees) polarization.

[Second Scheme (Mode 2)]

As shown in FIG. 3B and FIG. 4, switch 131 (SW 1) is turned on and switch 132 (SW 2) is turned off. Then, first antenna element 111 and second antenna element 121 are connected, and second antenna element 121 and first antenna element 112 are separated. Second antenna element 121 is arranged in the direction orthogonal to first antenna element 111, and, consequently, when first antenna element 111 and second antenna element 121 are connected, the antenna element formed with first antenna element 111 and second antenna element 121 provides diagonal polarization inclined at +45 degrees from vertical polarization. First antenna element 112 in the first polarization direction performs monopole antenna operations. Therefore, antenna apparatus 110 has antenna characteristics of (+45 degrees-90 degrees) polarization.

[Third Scheme (Mode 3)]

As shown in FIG. 3C and FIG. 4, switch 131 (SW 1) is turned off and switch 132 (SW 2) is turned on. Then, first antenna element 112 and second antenna element 121 are connected, and second antenna element 121 and first antenna element 111 are separated. Similar to first antenna element 111, second antenna element 121 is arranged in the direction orthogonal to first antenna element 112, and, consequently, when first antenna element 112 and second antenna element 121 are connected, the antenna element formed with first antenna element 112 and second antenna element 121 provides diagonal polarization inclined at −45 degrees from vertical polarization. First antenna element 111 in the first polarization direction performs monopole antenna operations. Therefore, antenna apparatus 110 has antenna characteristics of (90 degrees-(−45) degrees) polarization.

As shown in the table of FIG. 4, by switching switch 131 (SW 1) and switch 132 (SW 2), antenna apparatus 110 can provide three types of antenna characteristics of (90 degrees-90 degrees) polarization, (45 degrees-90 degrees) polarization and (90 degrees-(−45) degrees) polarization. By this means, even in the case where mismatch of polarization occurs in a receiving antenna due to the antenna configuration of the base station, the rotation of propagating polarization and the gradient of the terminal (e.g. portable radio device 100), it is possible to improve the receiving level by three variations of antenna polarizations. In particular, these antenna polarizations are effective to improve the received signal level in MIMO and diversity communication.

As described above, according to the present embodiment, antenna apparatus 110 is provided with first antenna elements 111 and 112 for the first polarization direction, second antenna element 121 set in the direction orthogonal to the first polarization direction, switches 131 and 132 that switch the connections between first antenna elements 111 and 112 and second antenna element 121, and feeding sections 141 and 142 provided in first antenna elements 111 and 112, respectively. By switching switches 131 and 132 and changing operating antenna elements, it is possible to switch the polarization characteristics of antenna apparatus 110, so that it is possible to provide antenna performance to cope with the condition of polarization that changes every minute between a base station and a terminal. By this means, it is possible to improve transmission capacity in various polarization environments and usage types. For example, in the case of portable radio device 100 mounting antenna apparatus 110 shown in FIG. 1, in MIMO communication or diversity communication, even if polarization of a base station fluctuates, propagating polarization fluctuates or polarization fluctuates due to various causes such as polarization changes caused by the gradient of the terminal, it is possible to perform MIMO communication or diversity communication with high transmission capacity by controlling switches 131 and 132 mounted on antenna apparatus 110 and providing the antenna directivity of optimal polarization characteristics according to the operation state.

Also, with the present embodiment, by using MEMS switches of low loss as switches 131 and 132, it is possible to alleviate the power loss due to switching and prevent the decrease in communication capacity.

(Embodiment 2)

FIG. 5 shows an outline configuration of a portable radio device mounting an antenna apparatus using a plurality of antenna elements according to Embodiment 2 of the present invention. In the explanation of the present embodiment, the same components as in FIG. 1 will be assigned the same reference numerals and overlapping explanation will be omitted.

In FIG. 5, portable radio device 200 has built-in antenna apparatus 210 using a plurality of antenna elements used in MIMO communication or diversity communication.

Antenna apparatus 210 is provided with first antenna elements 111 and 112 for the first polarization direction, second antenna element 121 set in the direction orthogonal to the first polarization direction, switches 131 and 132 that are set at one end of first antenna elements 111 and 112 and that switch the connections between first antenna elements 111 and 112 and second antenna element 121, and feeding sections 141 and 142 that are set in the other end of first antenna elements 111 and 112, respectively.

Antenna apparatus 210 differs from FIG. 1 only in arranging second antenna element 121 and switches 131 and 132 on the side opposite to the side of feeding sections 141 and 142 of antenna elements 111 and 112. Therefore, similar to antenna apparatus 110 in FIG. 1, antenna apparatus 210 employs a configuration where three antenna elements (i.e. first antenna elements 111 and 112 and second antenna element 121) are arranged in the shape of the letter "U," two switches (i.e. switches 131 and 132) are arranged between these antenna elements, and two feeding sections (i.e. feeding sections 141 and 142) are arranged in one end of first antenna elements 111 and 112.

Here, as is not shown in the figure, antenna apparatus 210 incorporated in portable radio device 100 may be provided transversely to the housing of portable radio device 200.

The operations of antenna apparatus 210 configured as above will be explained below.

The basic operations are the same as in Embodiment 1. An example case will be described where MIMO communication that switches polarization characteristics depending on the condition is performed.

Figure 6A:
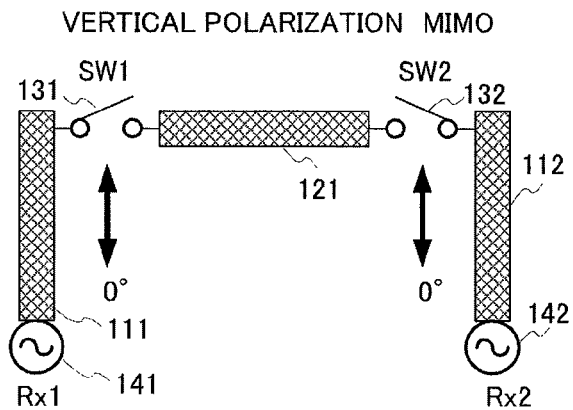
FIG. 6A illustrates switching of polarization characteristics of the above antenna apparatus according to Embodiment 2.
Figure 6B:
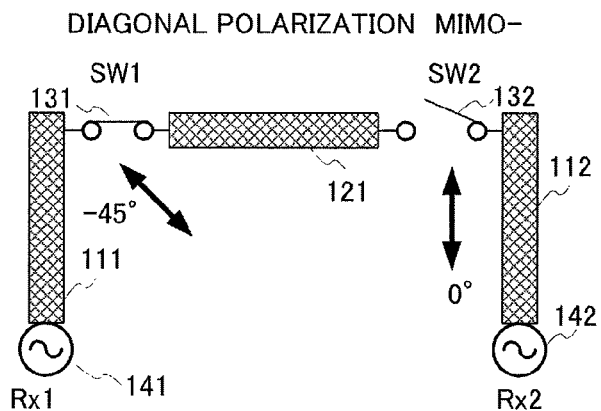
FIG. 6B illustrates switching of polarization characteristics of the above antenna apparatus according to Embodiment 2.
Figure 6C:
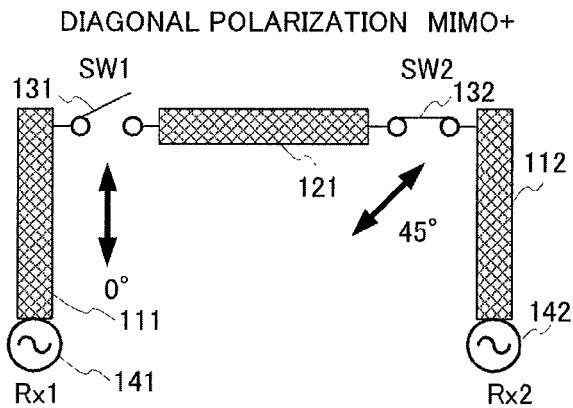
FIG. 6C illustrates switching of polarization characteristics of the above antenna apparatus according to Embodiment 2.

FIGS. 6A to 6C illustrate switching of polarization characteristics of antenna apparatus 210, where FIG. 6A shows vertical polarization in MIMO, FIG. 6B shows diagonal polarization (MIMO−) and FIG. 6C shows diagonal polarization (MIMO+). Also, FIG. 7 shows a table illustrating switching of polarization characteristics in FIGS. 6A to 6C. In FIGS. 6A to 6C and FIG. 7, diagonal polarization is inclined at +45 degrees or −45 degrees from vertical polarization. SW 1 and SW 2 represent switches 131 and 132, and Rx 1 and Rx 2 represent the receiving ends of portable radio device 200 with which antenna apparatus 210 is connected. Also, V represents vertical polarization. Also, if this antenna apparatus 210 is applied to the base station side that performs MIMO communication, Rx 1 and Rx 2 need to be read as Tx 1 and Tx 2.

[Fourth Scheme (Mode 4)]

As shown in FIG. 6A and FIG. 7, switch 131 (SW 1) and switch 132 (SW 2) are turned off. Then, second antenna element 121 is separated from first antenna elements 111 and 112, and only first antenna elements 111 and 112 in the first polarization direction perform monopole antenna operations. Therefore, antenna apparatus 210 has antenna characteristics of (90 degrees-90 degrees) polarization.

[Fifth Scheme (Mode 5)]

As shown in FIG. 6B and FIG. 7, switch 131 (SW 1) is turned on and switch 132 (SW 2) is turned off. Then, first antenna element 111 and second antenna element 121 are connected, and second antenna element 121 and first antenna element 112 are separated. Second antenna element 121 is arranged in the direction orthogonal to first antenna element 111, and, consequently, when first antenna element 111 and second antenna element 121 are connected, the antenna element formed with first antenna element 111 and second antenna element 121 provides diagonal polarization inclined at +45 degrees from vertical polarization. First antenna element 112 in the first polarization direction performs monopole antenna operations. Therefore, antenna apparatus 210 has antenna characteristics of (−45 degrees-90 degrees) polarization.

[Sixth Scheme (Mode 6)]

As shown in FIG. 6C and FIG. 7, switch 131 (SW 1) is turned off and switch 132 (SW 2) is turned on. Then, first antenna element 112 and second antenna element 121 are connected, and second antenna element 121 and first antenna element 111 are separated. Similar to first antenna element 111, second antenna element 121 is arranged in the direction orthogonal to first antenna element 112, and, consequently, when first antenna element 112 and second antenna element 121 are connected, the antenna element formed with first antenna element 112 and second antenna element 121 provides diagonal polarization inclined at −45 degrees from vertical polarization. First antenna element 111 in the first polarization direction performs monopole antenna operations. Therefore, antenna apparatus 210 has antenna characteristics of (90 degrees-45 degrees) polarization.

As shown in the table of FIG. 7, by switching switch 131 (SW 1) and switch 132 (SW 2), antenna apparatus 210 can provide three types of antenna characteristics of (90 degrees-90 degrees) polarization, (−45 degrees-90 degrees) polarization and (90 degrees-45 degrees) polarization. By this means, even in the case where mismatch of polarization occurs in a receiving antenna due to the antenna configuration of the base station, the rotation of propagating polarization and the gradient of the terminal (e.g. portable radio device 200), it is possible to improve the receiving level by three variations of antenna polarizations. In particular, these antenna polarizations are effective to improve the received signal level in MIMO and diversity communication. By switching switches 131 and 132 and changing operating antenna elements, it is possible to switch the polarization characteristics of antenna apparatus 210, so that it is possible to provide antenna performance to cope with the condition of polarization that changes every minute between a base station and a terminal. By this means, it is possible to improve transmission capacity in various polarization environments and usage types.

(Embodiment 3)

Cases have been described with Embodiments 1 and 2 where an antenna apparatus uses a plurality of antenna elements used in 2×2 MIMO communication or diversity communication. A case will be explained with Embodiment 3 where an antenna apparatus uses a plurality of antenna elements used in 3×3 MIMO communication or diversity communication.

Figure 8:
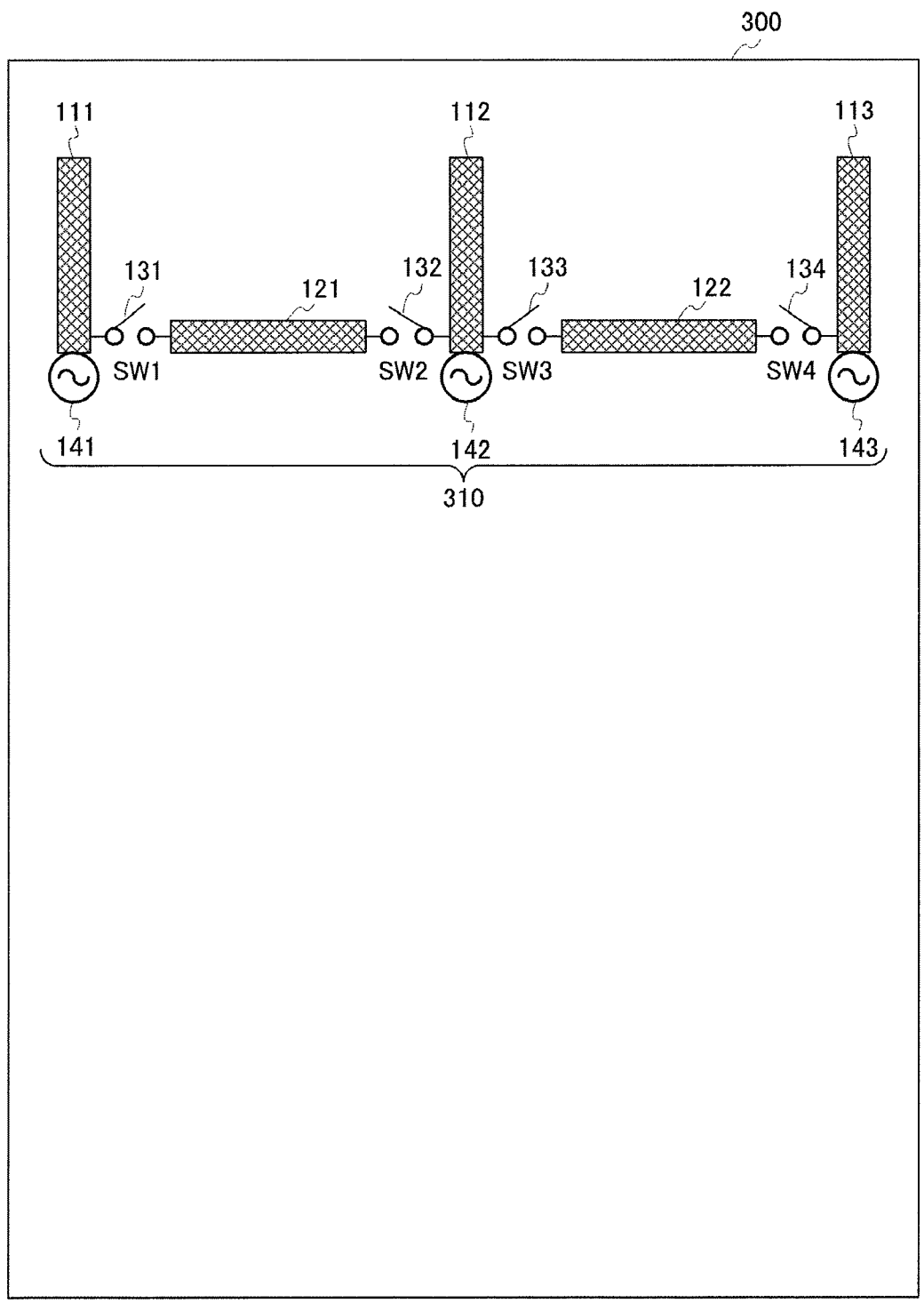
FIG. 8 shows an outline configuration of a portable radio device mounting an antenna apparatus using a plurality of antenna elements according to Embodiment 3 of the present invention.

FIG. 8 shows an outline configuration of a portable radio device mounting an antenna apparatus using a plurality of antenna elements according to Embodiment 3 of the present invention. In the explanation of the present embodiment, the same components as in FIG. 1 will be assigned the same reference numerals and overlapping explanation will be omitted.

In FIG. 8, portable radio device 300 has built-in antenna apparatus 310 using a plurality of antenna elements used in MIMO communication or diversity communication.

Antenna apparatus 310 is provided with first antenna elements 111, 112 and 113 for the first polarization direction, second antenna elements 121 and 122 set in the direction orthogonal to the first polarization direction, switches 131, 132, 133 and 134 that switch the connections between first antenna elements 111, 112 and 113 and second antenna elements 121 and 122, and feeding sections 141, 142 and 143 that are set in first antenna elements 111, 112 and 113.

Antenna apparatus 310 employs a configuration adding first antenna element 113, second antenna element 122, switches 133 and 134 and feeding section 143 to antenna apparatus 110 in FIG. 1.

The present embodiment shows a configuration example of an antenna apparatus in 3×3 MIMO communication. The number of antenna elements, the number of switches and the number of feeding points in the antenna apparatus are generally shown as follows.

In the case of N×N MIMO (where N is an arbitrary natural number), the number of feeding points is N, the number of elements is N+(N−1) and the number of switches is (N−1)×2.

Here, as is not shown in the figure, antenna apparatus 310 incorporated in portable radio device 300 may be provided transversely to the housing of portable radio device 300.

Also, although an example case has been described with FIG. 8 where antenna apparatus 310 is incorporated in the housing of portable radio device 300, it is equally possible to set antenna apparatus 310 in any positions such as the outside of portable radio device 300.

Figure 9A:
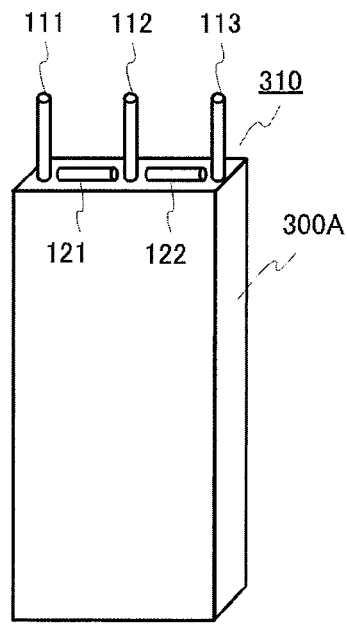
FIG. 9A shows a perspective view of an outline configuration of a portable radio device mounting the above antenna apparatus according to Embodiment 3.
Figure 9B:
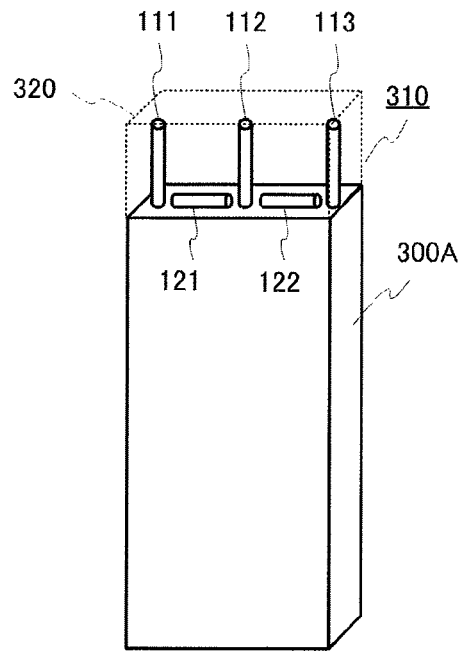
FIG. 9B shows a perspective view of an outline configuration of a portable radio device mounting the above antenna apparatus according to Embodiment 3.

FIGS. 9A and 9B show a perspective view of an outline configuration of a portable radio device mounting above antenna apparatus 310. As shown in FIG. 9A, it is possible to arrange antenna apparatus 310 in the upper part of portable radio device 300A, or cover antenna apparatus 310 with cover 320 as shown in FIG. 9B.

The operations of antenna apparatus 31 configured as above will be explained.

The basic operations are the same as in Embodiment 1. An example case will be described where 3×3 MIMO communication that switches polarization characteristics depending on the condition is performed.

Figure 10A:
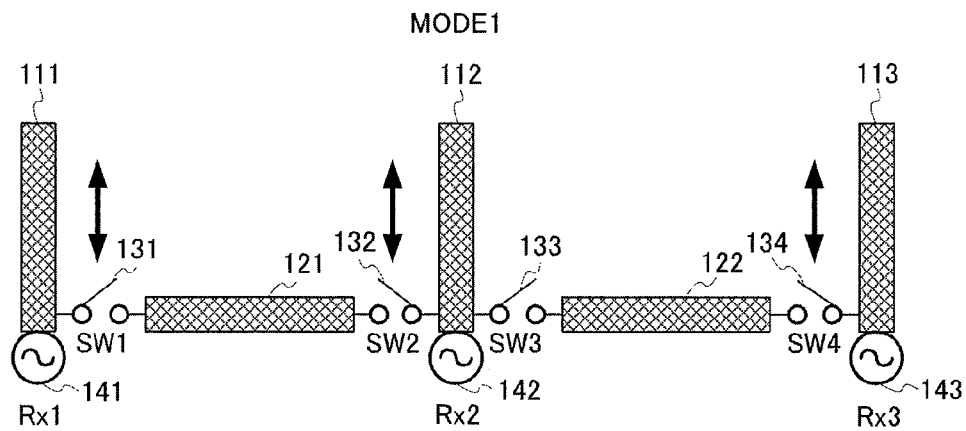
FIG. 10A illustrates switching of polarization characteristics of the above antenna apparatus according to Embodiment 3.
Figure 10B:
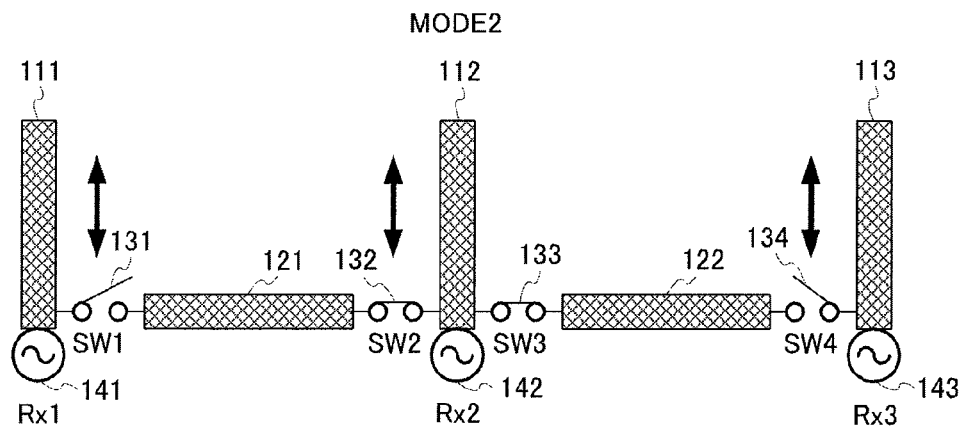
FIG. 10B illustrates switching of polarization characteristics of the above antenna apparatus according to Embodiment 3.
Figures 13, 14:
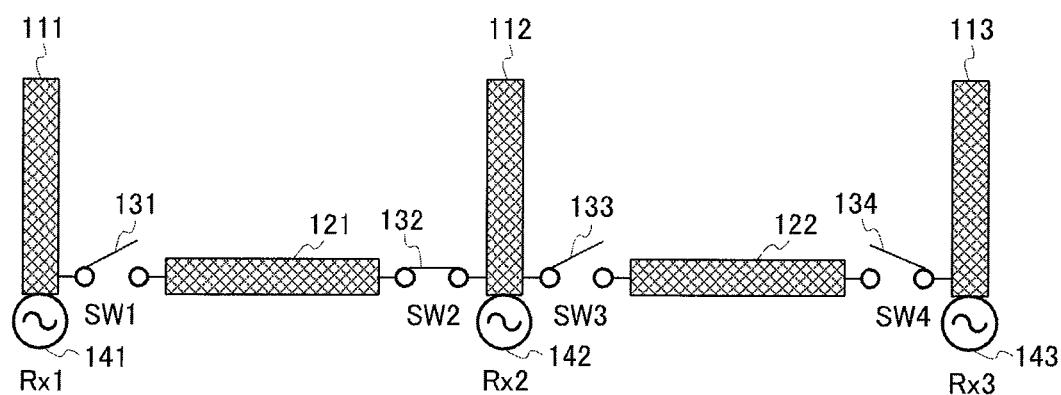
FIG. 13 shows a table illustrating switching of polarization characteristics in FIGS. 10G to 10I.
FIG. 14 illustrates a method of directly connecting feeding points of the above antenna apparatus according to Embodiment 3.

FIGS. 10A to 10I illustrate switching of polarization characteristics of antenna apparatus 310, where FIGS. 10A and 10B show vertical polarization in MIMO and FIGS. 10C to 10I show at least one diagonal polarization in the receiving end of portable radio device 300. Also, FIGS. 11 to 13 show a table illustrating switching of polarization characteristics in FIGS. 10A to 10I. In FIGS. 10A to 10I and FIGS. 11 to 13, diagonal polarization is inclined at +45 degrees or −45 degrees from vertical polarization. SW 1, SW 2 and SW 3 represent switches 131, 132 and 133, and Rx 1, Rx 2 and Rx 3 represent the receiving end of portable radio device 310 with which antenna apparatus 300 is connected. Also, if this antenna apparatus 310 is applied to the base station side that performs MIMO communication, Rx 1, Rx2 and Rx 3 need to be read as Tx 1, Tx 2 and Tx 3.

[First Scheme (Model 1)]

As shown in FIG. 10A and FIG. 11, switch 131 (SW 1) to switch 134 (SW 4) are turned off. Then, second antenna elements 121 and 122 are separated from first antenna elements 111, 112 and 113, and only first antenna elements 111, 112 and 113 in the first polarization direction perform monopole antenna operations. Therefore, antenna apparatus 310 has antenna characteristics of (90 degrees-90 degrees-90 degrees) polarization.

[Second Scheme (Mode 2)]

As shown in FIG. 10B and FIG. 11, switches 131 (SW 1) and 134 (SW 4) are turned off and switches 132 (SW 2) and 133 (SW 3) are turned on. Then, first antenna element 112 and second antenna elements 121 and 122 are connected, second antenna element 121 and first antenna element 111 are separated, and second antenna element 122 and first antenna element 113 are separated. Although second antenna elements 121 and 122 are arranged in the direction orthogonal to first antenna elements 111, 112 and 113, second antenna elements 121 and 122 are connected equally on the sides of first antenna element 112, and therefore the antenna element formed with first antenna element 112 and second antenna elements 121 and 122 provide vertical polarization. First antenna elements 111, 112 and 113 in the first polarization direction perform monopole antenna operations. Therefore, antenna apparatus 310 has antenna characteristics of (90 degrees-90 degrees-90 degrees) polarization.

[Third Scheme (Mode 3)]

Figure 10C:
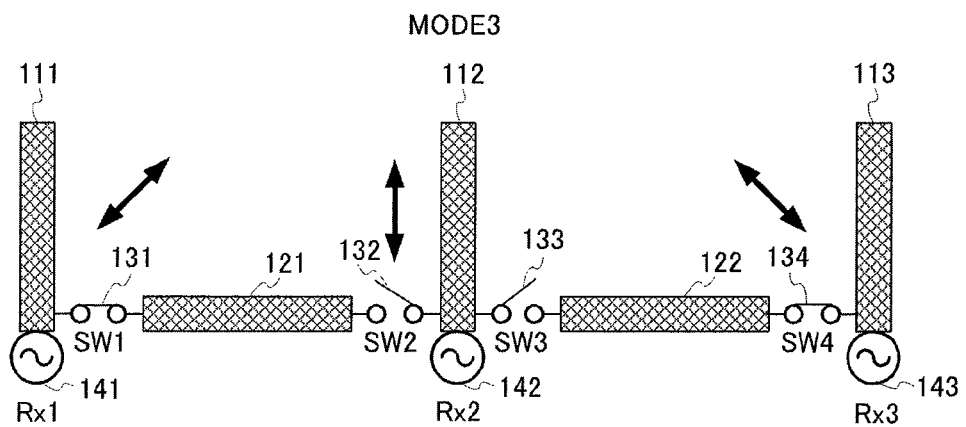
FIG. 10C illustrates switching of polarization characteristics of the above antenna apparatus according to Embodiment 3.

As shown in FIG. 10C and FIG. 11, switch 131 (SW 1) is turned on, switch 132 (SW 2) is turned off, switch 133 (SW 3) is turned off and switch 134 (SW 4) is turned on. Then, first antenna element 111 and second antenna elements 121 are connected, first antenna element 113 and second antenna element 122 are connected, and first antenna element 112 and second antenna elements 121 and 122 are separated. Second antenna elements 121 and 122 are arranged in the direction orthogonal to first antenna elements 111, 112 and 113, and, consequently, when first antenna element 111 and second antenna element 121 are connected, the antenna element formed with first antenna element 111 and second antenna element 121 provides diagonal polarization inclined at +45 degrees from vertical polarization. Similarly, when first antenna element 113 and second antenna element 122 are connected, the antenna element formed with first antenna element 113 and second antenna element 122 provides diagonal polarization inclined at −45 degrees from vertical polarization. First antenna element 112 in the first polarization direction performs monopole antenna operations. Therefore, antenna apparatus 310 has antenna characteristics of (45 degrees-90 degrees-(−45) degrees) polarization.

[Fourth Scheme (mode 4)]

Figure 10D:
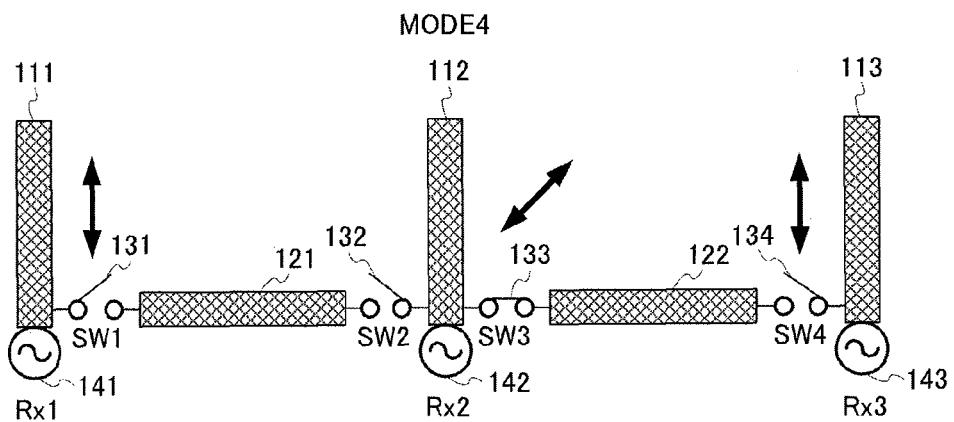
FIG. 10D illustrates switching of polarization characteristics of the above antenna apparatus according to Embodiment 3.

As shown in FIG. 10D and FIG. 12, switch 131 (SW 1) is turned off, switch 132 (SW 2) is turned off, switch 133 (SW 3) is turned on and switch 134 (SW 4) is turned off. Then, first antenna element 112 and second antenna elements 122 are connected, second antenna element 121 and first antenna element 111 are separated, and second antenna element 122 and first antenna elements 113 are separated. Second antenna elements 122 is arranged in the direction orthogonal to first antenna elements 111, 112 and 113, and, consequently, when first antenna element 112 and second antenna element 122 are connected, the antenna element formed with first antenna element 112 and second antenna element 122 provides diagonal polarization inclined at +45 degrees from vertical polarization. First antenna elements 112 and 113 in the first polarization direction perform monopole antenna operations. Therefore, antenna apparatus 310 has antenna characteristics of (90 degrees-45 degrees-90 degrees) polarization.

[Fifth Scheme (Mode 5)]

Figure 10E:
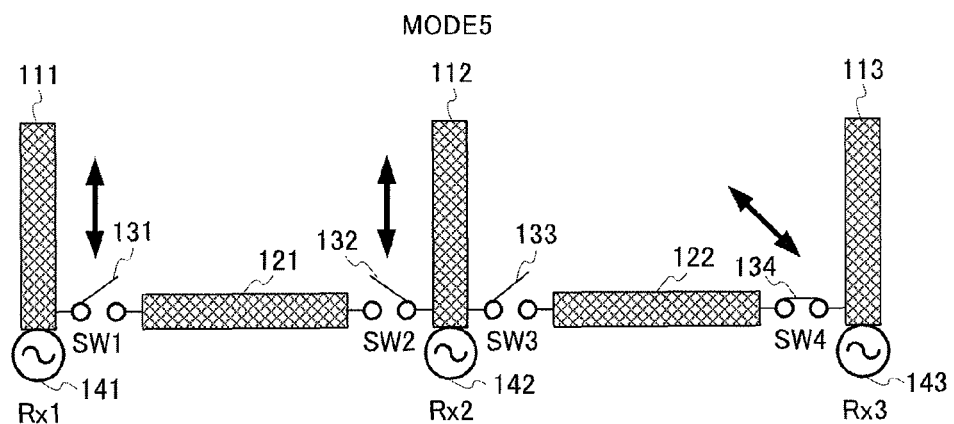
FIG. 10E illustrates switching of polarization characteristics of the above antenna apparatus according to Embodiment 3.

As shown in FIG. 10E and FIG. 12, switch 131 (SW 1) is turned off, switch 132 (SW 2) is turned off, switch 133 (SW 3) is turned off and switch 134 (SW 4) is turned on. Then, first antenna element 113 and second antenna element 122 are connected, second antenna element 121 and first antenna element 111 are separated, and second antenna element 122 and first antenna element 112 are separated. Second antenna elements 122 is arranged in the direction orthogonal to first antenna elements 111, 112 and 113, and, consequently, when first antenna element 113 and second antenna element 122 are connected, the antenna element formed with first antenna element 113 and second antenna element 122 provides diagonal polarization inclined at −45 degrees from vertical polarization. First antenna elements 111 and 112 in the first polarization direction perform monopole antenna operations. Therefore, antenna apparatus 310 has antenna characteristics of (90 degrees-90 degrees-(−45) degrees) polarization.

[Sixth Scheme (Mode 6)]

Figure 10F:
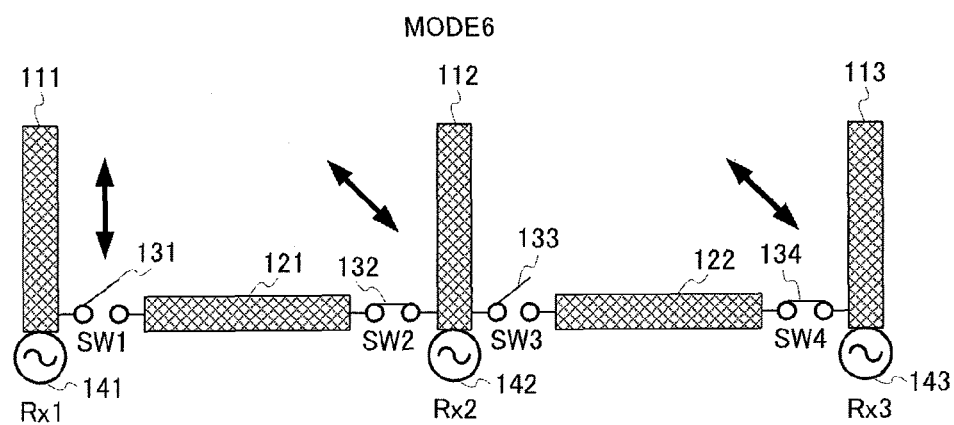
FIG. 10F illustrates switching of polarization characteristics of the above antenna apparatus according to Embodiment 3.

As shown in FIG. 10F and FIG. 12, switch 131 (SW 1) is turned off, switch 132 (SW 2) is turned on, switch 133 (SW 3) is turned off and switch 134 (SW 4) is turned on. Then, first antenna element 112 and second antenna element 121 are connected, first antenna element 113 and second antenna element 122 are separated, second antenna element 121 and first antenna element 111 are separated, and second antenna element 122 and first antenna element 112 are separated. Second antenna elements 121 and 122 are arranged in the direction orthogonal to first antenna elements 111, 112 and 113, and, consequently, when first antenna element 112 and second antenna element 121 are connected, the antenna element formed with first antenna element 112 and second antenna element 121 provides diagonal polarization inclined at −45 degrees from vertical polarization. Similarly, when first antenna element 113 and second antenna element 122 are connected, the antenna element formed with first antenna element 113 and second antenna element 122 also provides diagonal polarization inclined at −45 degrees from vertical polarization. First antenna element 111 in the first polarization direction performs monopole antenna operations. Therefore, antenna apparatus 310 has antenna characteristics of (90 degrees-(−45) degrees-(−45) degrees) polarization.

[Seventh Scheme (Mode 7)]

Figure 10G:
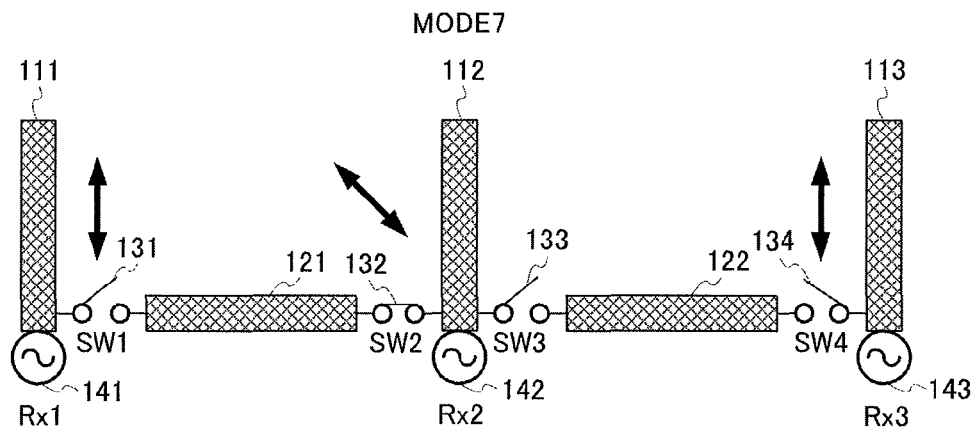
FIG. 10G illustrates switching of polarization characteristics of the above antenna apparatus according to Embodiment 3.

As shown in FIG. 10G and FIG. 13, switch 131 (SW 1) is turned off, switch 132 (SW 2) is turned on, switch 133 (SW 3) is turned off and switch 134 (SW 4) is turned off. Then, first antenna element 112 and second antenna element 121 are connected, second antenna element 122 and first antenna elements 112 and 113 are separated. Second antenna elements 121 is arranged in the direction orthogonal to first antenna elements 111, 112 and 113, and, consequently, when first antenna element 112 and second antenna element 121 are connected, the antenna element formed with first antenna element 112 and second antenna element 121 provides diagonal polarization inclined at −45 degrees from vertical polarization. First antenna elements 111 and 113 in the first polarization direction perform monopole antenna operations. Therefore, antenna apparatus 310 has antenna characteristics of (90 degrees-(−45) degrees-90 degrees) polarization.

[Eighth Scheme (Mode 8)]

Figure 10H:
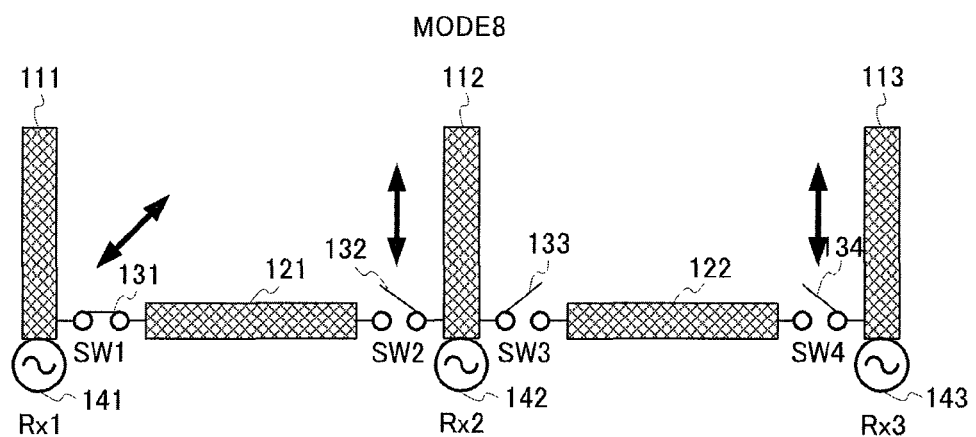
FIG. 10H illustrates switching of polarization characteristics of the above antenna apparatus according to Embodiment 3.

As shown in FIG. 10H and FIG. 13, switch 131 (SW 1) is turned on, switch 132 (SW 2) is turned off, switch 133 (SW 3) is turned off and switch 134 (SW 4) is turned off. Then, first antenna element 111 and second antenna elements 121 are connected, second antenna element 122 and first antenna elements 112 and 113 are separated. Second antenna elements 121 is arranged in the direction orthogonal to first antenna elements 111, 112 and 113, and, consequently, when first antenna element 111 and second antenna element 121 are connected, the antenna element formed with first antenna element 111 and second antenna element 121 provides diagonal polarization inclined at +45 degrees from vertical polarization. First antenna elements 112 and 113 in the first polarization direction perform monopole antenna operations. Therefore, antenna apparatus 310 has antenna characteristics of (45 degrees-90 degrees-90 degrees) polarization.

[Ninth Scheme (Mode 9)]

Figure 10I:
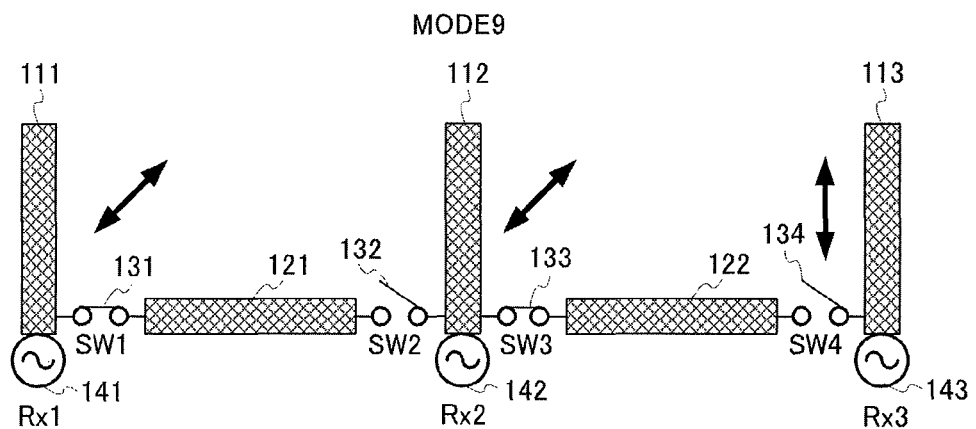
FIG. 10I illustrates switching of polarization characteristics of the above antenna apparatus according to Embodiment 3.

As shown in FIG. 10I and FIG. 13, switch 131 (SW 1) is turned on, switch 132 (SW 2) is turned off, switch 133 (SW 3) is turned on and switch 134 (SW 4) is turned off. Then, first antenna element 111 and second antenna element 121 are connected, first antenna element 112 and second antenna element 122 are connected, and second antenna element 122 and first antenna element 113 are separated. Second antenna elements 121 and 122 are arranged in the direction orthogonal to first antenna elements 111, 112 and 113, and, consequently, when first antenna element 111 and second antenna element 121 are connected and first antenna element 112 and second antenna element 122 are connected, the antenna element formed with first antenna element 111 and second antenna element 121 and the antenna element formed with first antenna element 112 and second antenna element 122 provide diagonal polarization inclined at +45 degrees from vertical polarization. First antenna element 113 in the first polarization direction performs monopole antenna operations. Therefore, antenna apparatus 310 has antenna characteristics of (45 degrees-45 degrees-90 degrees) polarization.

Thus, by switching switches 131 to 134 (SW 1 to SW 4), antenna apparatus 310 can provide antenna characteristics of combinations of polarizations in the tables shown in FIG. 12 and FIG. 13. By this means, even in the case where mismatch of polarization occurs in a receiving antenna due to the antenna configuration of the base station, the rotation of propagating polarization and the gradient of the terminal (e.g. portable radio device 300), it is possible to improve the receiving level by various variations of antenna polarizations. In particular, these antenna polarizations are effective to improve the received signal level in MIMO and diversity communication. That is, by switching between switches 131 to 134 (SW 1 to SW 4) and changing operating antenna elements, it is possible to switch polarization characteristics with more variations than in Embodiments 1 and 2, so that it is possible to provide antenna performance to cope with the condition of polarization that changes every minute between a base station and a terminal. As a result, it is possible to improve transmission capacity in various polarization environments and usage types.

Here, it is possible to use above antenna apparatus 310 of the same configuration between the receiving side and the transmitting side. A supplemental case will be explained where feeding points of antenna apparatus 310 are connected directly.

FIG. 14 illustrates a method of directly connecting feeding points of antenna apparatus 310.

In the case of using antenna apparatus 310 on the receiving side, there is no problem if feeding points of antenna apparatus 310 are directly connected. However, in the case of using antenna apparatus 310 in, for example, a base station on the transmitting side, it is not possible to directly connect feeding points of antenna apparatus 310. For example, in the case of using antenna apparatus 310 on the transmitting side, it is not possible to implement a combination of switch operations in which switch 131 (SW 1) and switch 132 (SW 2) are turned on or switch 133 (SW 3) and switch 134 (SW 4) are turned on in FIG. 14.

(Embodiment 4)

FIG. 15 shows a perspective view of an outline configuration of a portable radio device mounting an antenna apparatus using a plurality of antenna elements, according to Embodiment 4 of the present invention. In the explanation of the present embodiment, the same components as in FIG. 1 and FIG. 8 will be assigned the same reference numerals and overlapping explanation will be omitted.

Figure 15A:
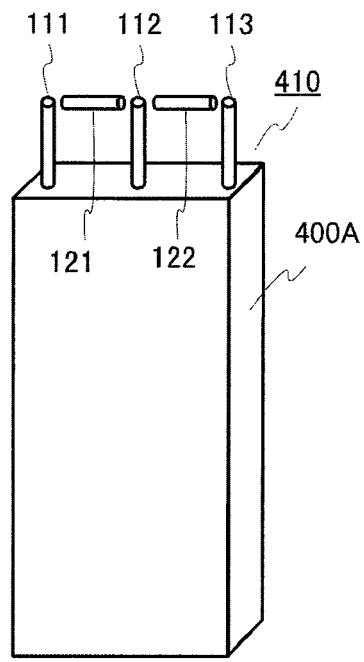
FIG. 15A shows a perspective view of an outline configuration of a portable radio device mounting the above antenna apparatus using a plurality of antenna elements according to Embodiment 4 of the present invention.
Figure 15B:
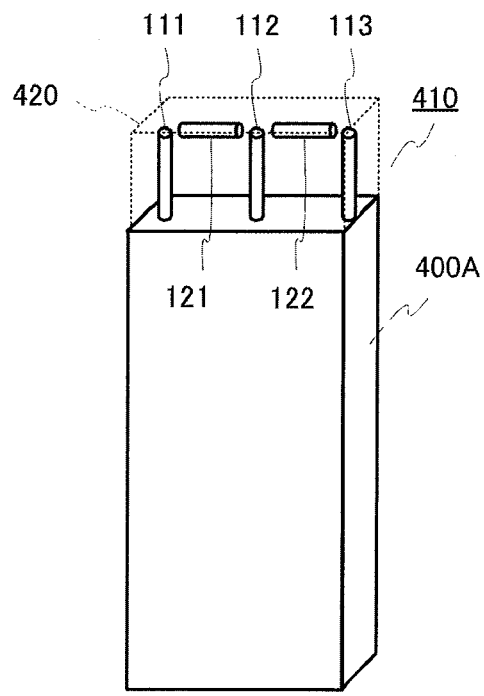
FIG. 15B shows a perspective view of an outline configuration of a portable radio device mounting the above antenna apparatus using a plurality of antenna elements according to Embodiment 4.

In FIGS. 15A and 15B, antenna apparatus 410 using a plurality of antenna elements used in MIMO communication or diversity communication, is placed on the upper part of portable radio device 400A.

Antenna apparatus 410 is provided with first antenna elements 111, 112 and 113 for the first polarization direction, second antenna elements 121 and 122 that are set in the direction orthogonal to the first polarization direction, switches 131, 132, 133 and 134 (not shown in FIG. 15A) that are set in one end of first antenna elements 111, 112 and 113 and that switch the connections between first antenna elements 111, 112 and 113 and second antenna elements 121 and 122, and feeding sections 141, 142 and 143 (not shown in FIG. 15A) that are provided in first antenna elements 111, 112 and 113, respectively.

Antenna apparatus 410 differs from FIG. 8 only in arranging second antenna elements 121 and 122 and switches 131, 132 and 133 on the side opposite to the side of feeding sections 141, 142 and 143 of antenna elements 111, 112 and 113.

Also, as shown in FIG. 9B, it is possible to arrange antenna apparatus 410 in the upper part of portable radio device 400A and further cover antenna apparatus 410 with cover 420.

The operations of antenna apparatus 410 configured as above are the same as in Embodiment 1 and explanation will be omitted.

Thus, according to the present embodiment, similar to Embodiment 3, by switching between switches 131 to 134 (SW 1 to SW 4), it is possible to acquire the antenna characteristics of various combinations. By this means, even in the case where mismatch of polarization occurs in a receiving antenna due to the antenna configuration of the base station, the rotation of propagating polarization and the gradient of the terminal (e.g. portable radio device 400), it is possible to improve the receiving level by various variations of antenna polarizations. In particular, these antenna polarizations are effective to improve the received signal level in MIMO and diversity communication. Also, with the present embodiment, similar to Embodiment 3, by switching between switches 131 to 134 (SW 1 to SW 4) and changing operating antenna elements, it is possible to switch polarization characteristics with more variations than in Embodiments 1 and 2, so that it is possible to provide antenna performance to cope with the condition of polarization that changes every minute between a base station and a terminal. As a result, it is possible to improve transmission capacity in various polarization environments and usage types.

(Embodiment 5)

Figure 16:
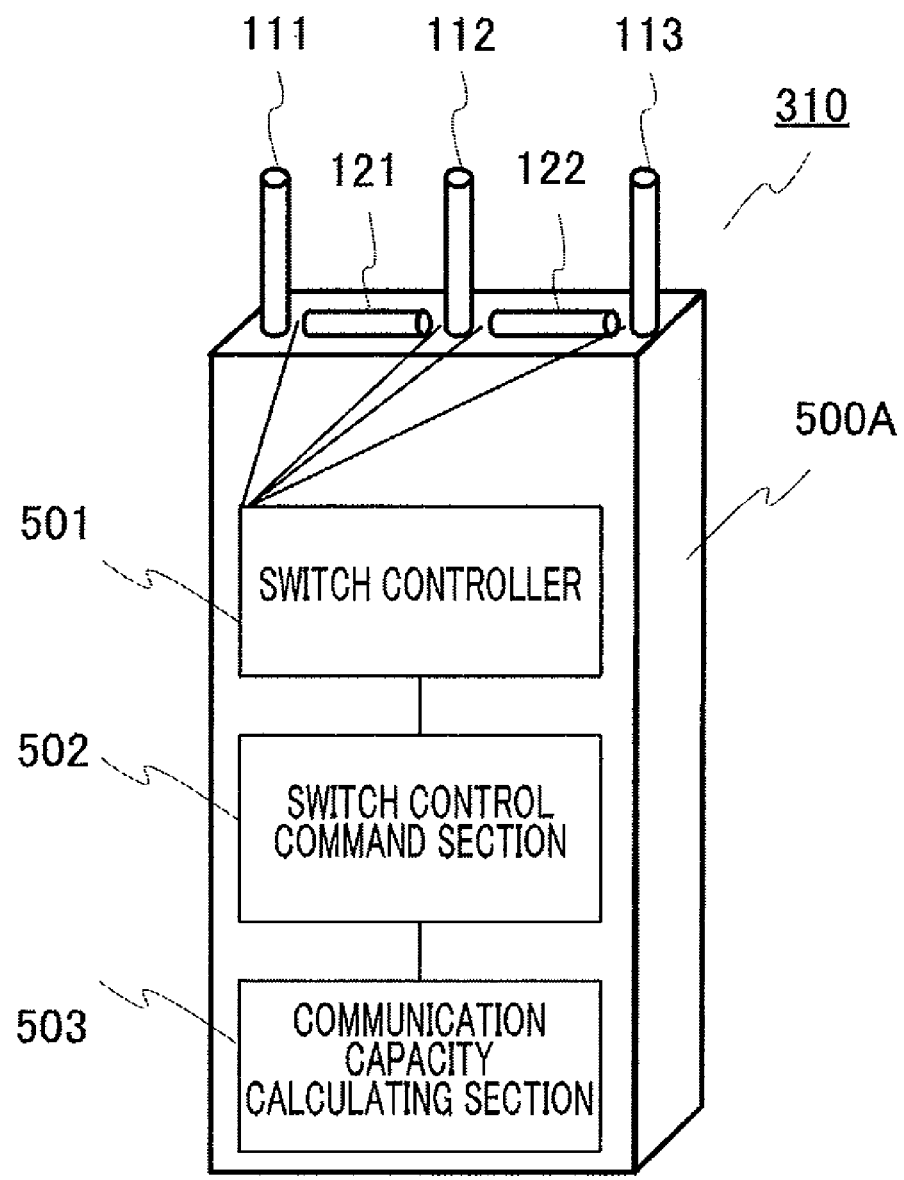
FIG. 16 shows a perspective view of an outline configuration of a portable radio device mounting an antenna apparatus using a plurality of antenna elements according to Embodiment 5 of the present invention

FIG. 16 shows a perspective view of an outline configuration of a portable radio device mounting an antenna apparatus using a plurality of antenna elements, according to Embodiment 5 of the present invention. In the explanation of the present embodiment, the same components as in FIG. 1 and FIG. 9A will be assigned the same reference numerals and overlapping explanation will be omitted.

In FIG. 16, antenna apparatus 310 using a plurality of antenna elements used in MIMO communication or diversity communication, is placed on the upper part of portable radio device 500A.

Also, switch controller 501 that controls switching between switches 131, 132, 133 and 134 (not shown) of antenna apparatus 310, switch controller command section 502 that controls switch controller 501 and communication capacity calculating section 503 that calculates the communication capacity, are provided in portable radio device 500A.

Above switch controller command section 502 and communication capacity calculating section 503 may be comprised of, for example, microprocessors or electronic circuits such as a logical circuit and timer. Here, in the case of forming these sections with microprocessors, it is equally possible to use resources such as a CPU provided as a main unit function in portable radio device 500A.

The operations of portable radio device 500A having antenna apparatus 310 configured as above will be explained. The operations of antenna apparatus 310 are the same as in Embodiment 1 and explanation will be omitted, and the specific operations of the present embodiment will be described.

Switch controller command section 502 sequentially switches between switches 131, 132, 133 and 134 via switch controller 501, according to predetermined operation modes. For example, switch controller command section 502 commands switch controller 501 to switch between switches 131, 132, 133 and 134 in a switching configuration to implement Mode 1, Mode 2 to Mode 3 in order, as shown in FIGS. 10A to 10C and FIG. 11. By this means, switches 131, 132, 133 and 134 are switched in a switching configuration to implement above Mode 1, Mode 2 to Mode 3 in order.

Communication capacity calculating section 503 detects the communication capacities upon switching a switching configuration to implement Mode 1, Mode 2 to Mode 3 in order. Further, communication capacity calculating section 503 compares the communication capacities of those modes, and outputs a signal to report the mode in which the highest communication capacity is found, to switch controller command section 502. Switch controller command section 502 gives a command to switch the switch configuration to the switch configuration corresponding to the mode in which the highest communication capacity is found. By this means, portable radio device 500A is operated so as to perform communication in the mode in which the highest communication capacity is found.

The above operation flow is implemented at arbitrary timings. Also, it is equally possible to implement the operation flow at regular time intervals.

Thus, according to the present embodiment, by switching between switches 131 to 134 (SW 1 to SW 4) to perform communication in a mode in which the highest communication capacity is found, even in the case where mismatch of polarization occurs in a receiving antenna due to the antenna configuration of the base station, the rotation of propagating polarization and the gradient of the terminal (e.g. portable radio device 300), portable radio device 500A can switch the polarization characteristics with the best reception signal level and provide antenna performance to cope with the condition of polarization that changes every minute between the base station and a terminal. As a result, it is possible to further improve transmission capacity in various polarization environments and usage types.

Also, by forming switch controller command section 502 and communication capacity calculating section 503 using resources such as a CPU provided as a main unit function in portable radio device 500A, it is possible to provide an advantage of requiring no additional components and realizing the configuration in an easy manner. Also, there is an advantage of making it possible to set and change a specification in an easy manner.

Also, it is natural that the present embodiment can be combined with above Embodiments 1 to 4.

The above explanation is an example of the best mode for carrying out the present invention, and the scope of the present invention is not limited to this.

The present invention is applicable to any apparatuses as long as these apparatuses are equivalent to a communication apparatus having an antenna apparatus using a plurality of antenna elements for performing diversity operations, MIMO communication or adaptive array antenna operations. For example, the present invention is applicable to a mobile telephone device and PHS (Personal Handy-phone System) as well as portable information terminals such as PDA (Personal Digital Assistant) and information processing apparatuses such as a laptop computer.

Also, in the above embodiments, a used frequency band is not limited to the DTV band, and any bands are applicable. As a portable radio device supporting a plurality of frequency bands, in Japan, portable radio devices are commercialized which use both PDC (Personal Digital Cellular) using a 900 MHz band and CDMA (Code Division Multiple Access) using a 2 GHz band. Even in foreign countries, portable radio devices are commercialized which use GSM (Global System for Mobile communications) using a 900 MHz band, DCS (Digital Communication System) using a 1.8 GHz band, PCS (Personal Communication Services) using 1.9 GHz and UMTS (Universal Mobile Telecommunication System) using a 2 GHz band. For example, a case is possible where the first frequency band is a 2 GHz single band and a second frequency band is comprised of three bands of 900 MHz band, 1.8 GHz band and 1.9 GHz band.

Also, although the name "portable radio device" is used for ease of explanation in the above embodiments, for example, "portable telephone device" and "wireless communication apparatus" are equally applicable. Also, a communication apparatus having an antenna apparatus may be a base station apparatus on the transmitting side, for example.

Also, the type, the number and the method of connecting circuits forming the above portable radio device are not limited to the above embodiments.

Industrial Applicability

With the antenna apparatus and communication apparatus of the present invention, it is possible to provide a communication apparatus having an antenna apparatus using a plurality of antenna elements for performing diversity operations, MIMO communication or adaptive array antenna operations. Further, it is possible to provide optimal antenna performance for received signals that attenuate or fluctuate due to the condition of polarization that changes every minute between a base station and a terminal. Especially, the present invention is useful for techniques having an advantage of preventing the decrease in communication capacity in communication using a plurality of antenna elements for performing diversity operations, MIMO communication or adaptive array antenna operations.

The invention claimed is:

1. An antenna apparatus comprising:
   at least two first antenna elements for a first polarization direction;
   a second antenna element that is set in a direction orthogonal to the first polarization direction;
   a switch that switches connections between the first antenna elements and the second antenna element; and
   a feeding section that is set in each of the first antenna elements.

2. The antenna apparatus according to claim 1, wherein the switch switches the connections depending on a polarization direction.

3. The antenna apparatus according to claim 1, wherein, when a number of feeding points of the feeding section is N (where N is an arbitrary natural number), a number of the first antenna elements and second antenna elements is N+(N−1), and a number of switches is (N−1)×2.

4. A communication apparatus having an antenna apparatus used for MIMO (Multiple Input Multiple Output) or diversity, wherein the antenna apparatus is the antenna apparatus according to claim 1.

* * * * *